United States Patent
Yen et al.

(10) Patent No.: US 8,976,522 B2
(45) Date of Patent: Mar. 10, 2015

(54) PORTABLE ELECTRONIC DEVICE AND DOCKING DEVICE THEREOF

(75) Inventors: Chia-Lian Yen, New Taipei (TW); Hua-Chung Tseng, New Taipei (TW)

(73) Assignee: Wistron Corp., New Taipei (TW)

( * ) Notice: Subject to any disclaimer, the term of this patent is extended or adjusted under 35 U.S.C. 154(b) by 284 days.

(21) Appl. No.: 13/559,487

(22) Filed: Jul. 26, 2012

(65) Prior Publication Data
US 2013/0176673 A1  Jul. 11, 2013

(30) Foreign Application Priority Data

Jan. 5, 2012 (TW) .............................. 101100412 A

(51) Int. Cl.
*G06F 1/16* (2006.01)
(52) U.S. Cl.
USPC ....... 361/679.41; 345/169; 455/418; 312/209
(58) Field of Classification Search
USPC .......... 345/87, 156, 173, 204, 1.1, 168, 30, 8, 345/161, 169; 361/679.01, 679.09, 679.29, 361/679.26, 679.27, 679.28, 679.07, 361/679.17, 679.55, 679.06, 679.08, 361/679.21, 679.48, 679.57, 679.41, 361/679.15, 679.2, 679.33, 679.03, 679.56, 361/679.47, 679.43; 455/556.1, 552.1, 455/569.1, 557, 450, 566, 426.1, 418; 16/319, 320, 366, 221, 382; 312/326, 312/331, 34.11, 34.12, 209; 435/21, 6.1, 2, 435/287.1, 287.2, 287.3, 289, 6.11, 6.14, 435/297.2
See application file for complete search history.

(56) References Cited

U.S. PATENT DOCUMENTS

| 2014/0111912 A1* | 4/2014 | Gobeil ..................... 361/679.01 |
| 2014/0130303 A1* | 5/2014 | Liao et al. ...................... 16/319 |

FOREIGN PATENT DOCUMENTS

| TW | M243698 | 9/2004 |
| TW | 200936013 | 8/2009 |
| TW | M405716 | 6/2011 |

OTHER PUBLICATIONS

Taiwan Patent Office, Office Action, Patent Application Serial No. 101100412, May 12, 2014, Taiwan.

* cited by examiner

*Primary Examiner* — Hung Duong

(57) ABSTRACT

A docking device for connection to a touch display device is provided. The docking device includes a docking body, a pivot unit and a frame. The pivot unit is connected to the docking body. The frame is connected to the pivot unit and pivoted relative to the docking body, wherein the touch display device is detachably disposed on the frame.

17 Claims, 9 Drawing Sheets

US 8,976,522 B2

PORTABLE ELECTRONIC DEVICE AND DOCKING DEVICE THEREOF

CROSS REFERENCE TO RELATED APPLICATIONS

This Application claims priority of Taiwan Patent Application No. 101100412, filed on Jan. 5, 2012, the entirety of which is incorporated by reference herein.

BACKGROUND OF THE INVENTION

1. Field of the Invention

The present invention relates to docking device, and in particular relates to a docking device for connection to a tablet computer.

2. Description of the Related Art

Tablet computers are gradually becoming popular. The tablet computer is usually operated via a touch screen disposed thereon. However, the tablet computer can also be connected to a docking device, and operated via a keyboard, mouse or other interface devices.

Conventionally, the tablet computer is foxed to the docking device with an immobile mounting angle, and the mounting angle of the tablet computer therefore cannot be adjusted according to the demands of users.

BRIEF SUMMARY OF THE INVENTION

In one embodiment of the invention, a docking device for connection to a touch display device is provided. The docking device includes a docking body, a pivot unit and a frame. The pivot unit is connected to the docking body. The frame is connected to the pivot unit and pivoted relative to the docking body, wherein the touch display device is detachably disposed on the frame.

In another embodiment of the invention, a portable electronic device is provided. The portable electronic device includes a touch display device and a docking device. The docking device includes a docking body, a pivot unit and a frame. The pivot unit is connected to the docking body. The frame is connected to the pivot unit and pivoted relative to the docking body, wherein the touch display device is detachably disposed on the frame.

Utilizing the docking device of the embodiment of the invention, the touch display device (for example, tablet computer) can be pivoted on the docking device around the first pivot axis and the second pivot axis relative to the docking device to satisfy the operation demands of users.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
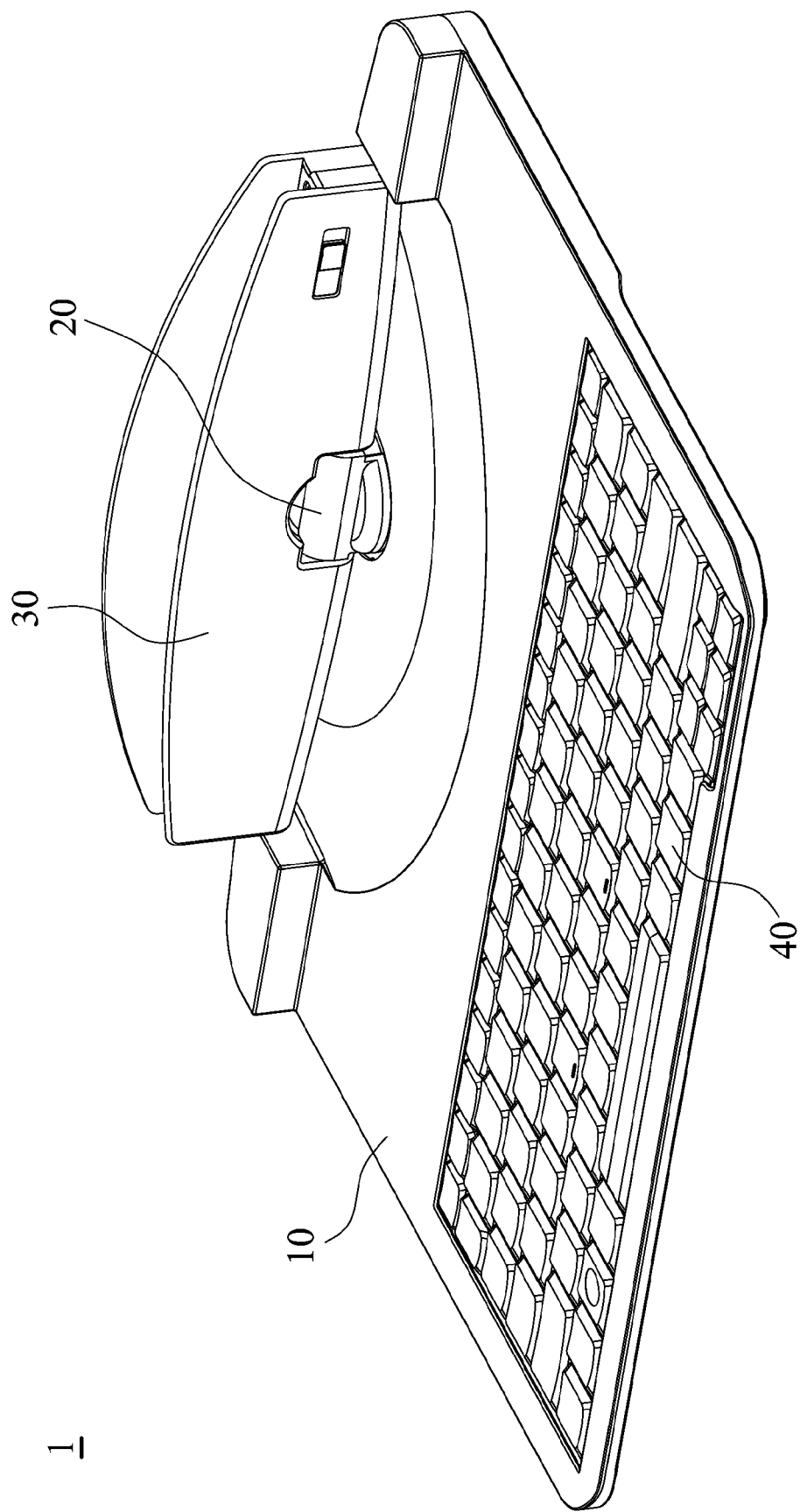
FIG. 1 is an assembled view of the docking device of the embodiment of the invention.
Figure 2A:
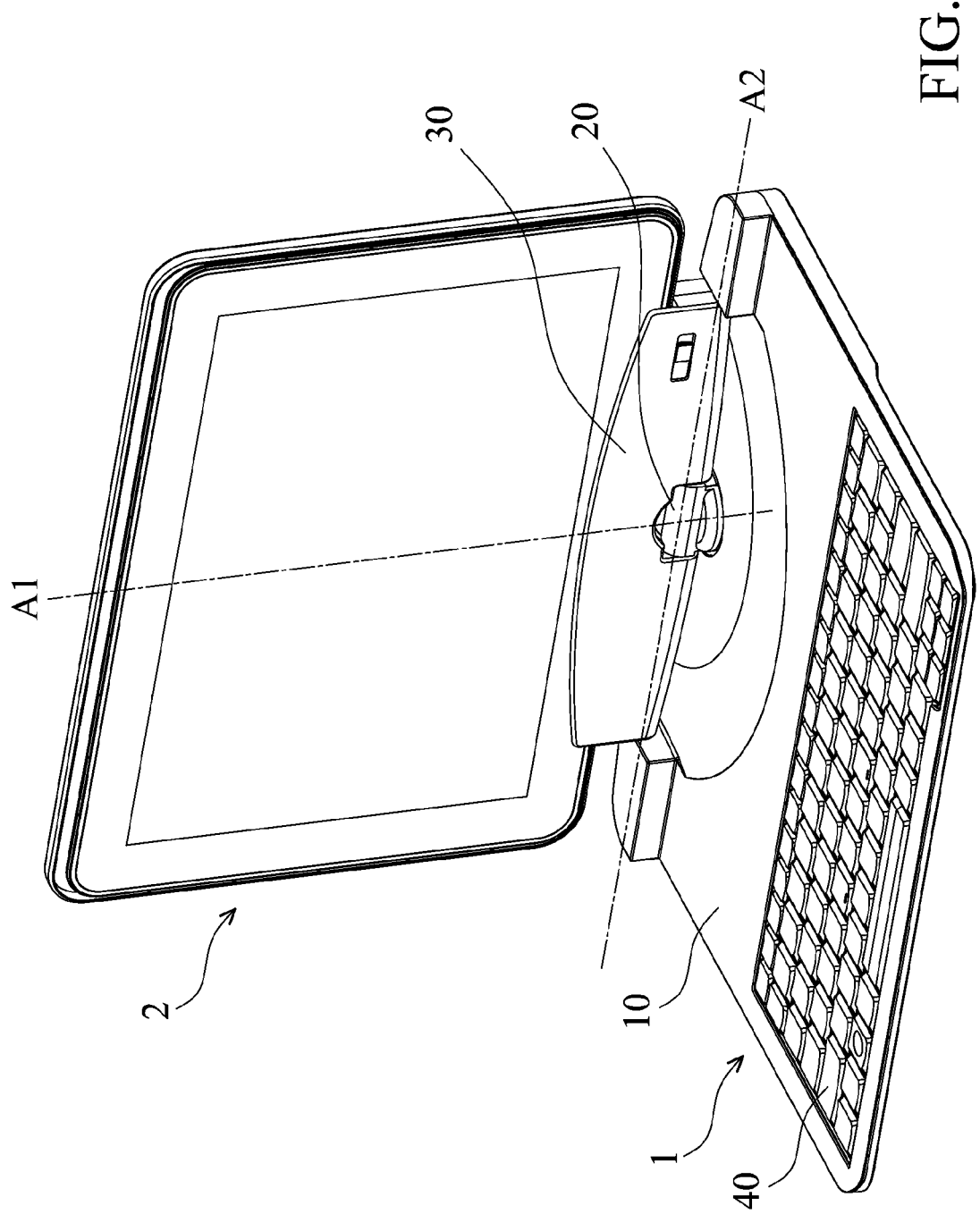
FIGS. 2A to 2D show the touch display device pivoted on the docking device of the embodiment of the invention.
Figure 2B:
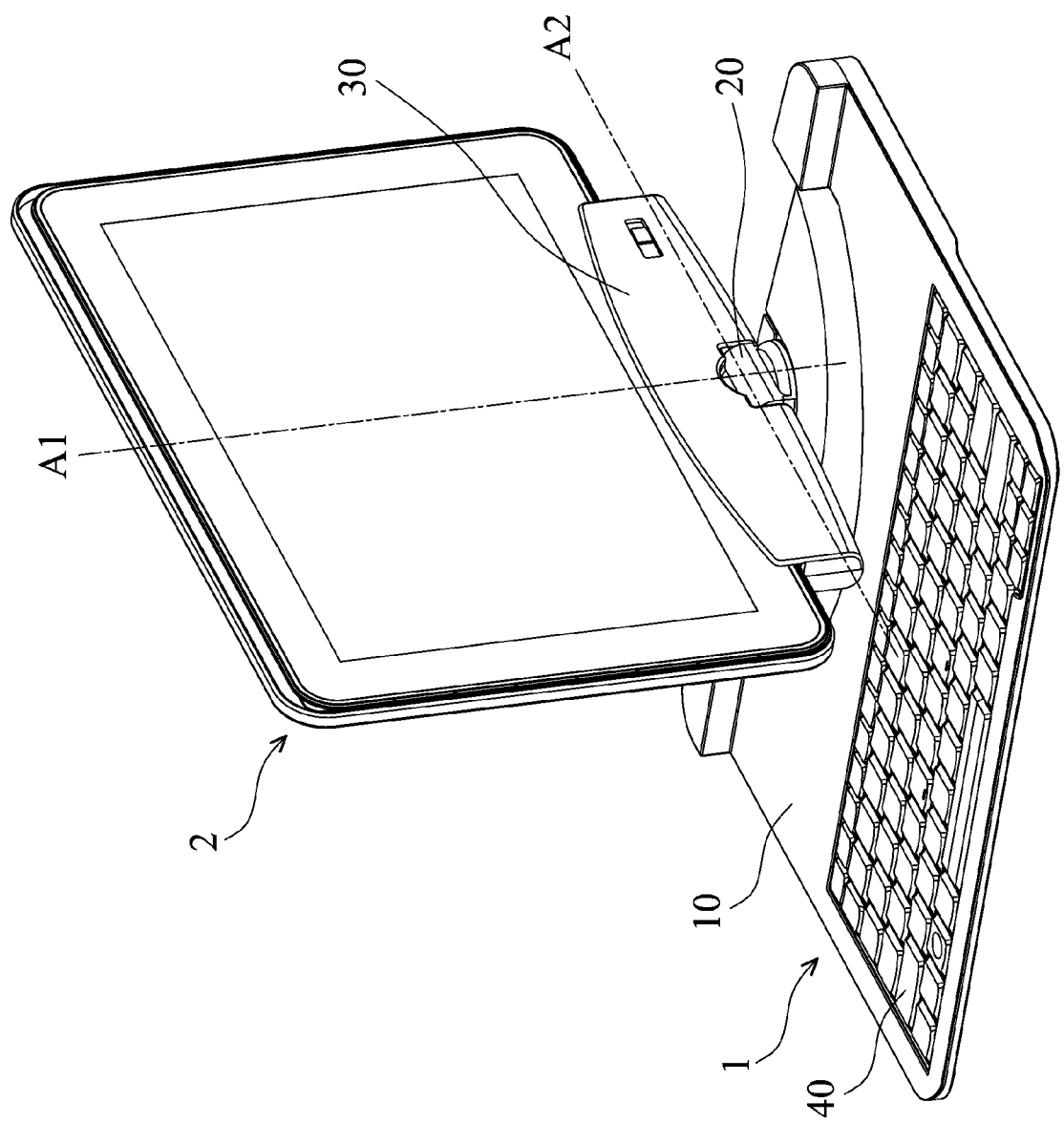

FIG. 1 shows a docking device 1 of an embodiment of the invention, which is adapted for connection to a touch display device 2 (with reference to FIG. 2A). The docking device 1 includes a docking body 10, a pivot unit 20, a frame 30 and an operation interface 40. The pivot unit 20 is connected to the docking body 10. The frame 30 is connected to the pivot unit 20 by a screw or other means, and is pivoted relative to the docking body 10. With reference to FIG. 2A, the touch display device 2 is detachably disposed on the frame 30. The operation interface 40 (for example, keyboard) is disposed on the docking body 10.

Figure 2C:
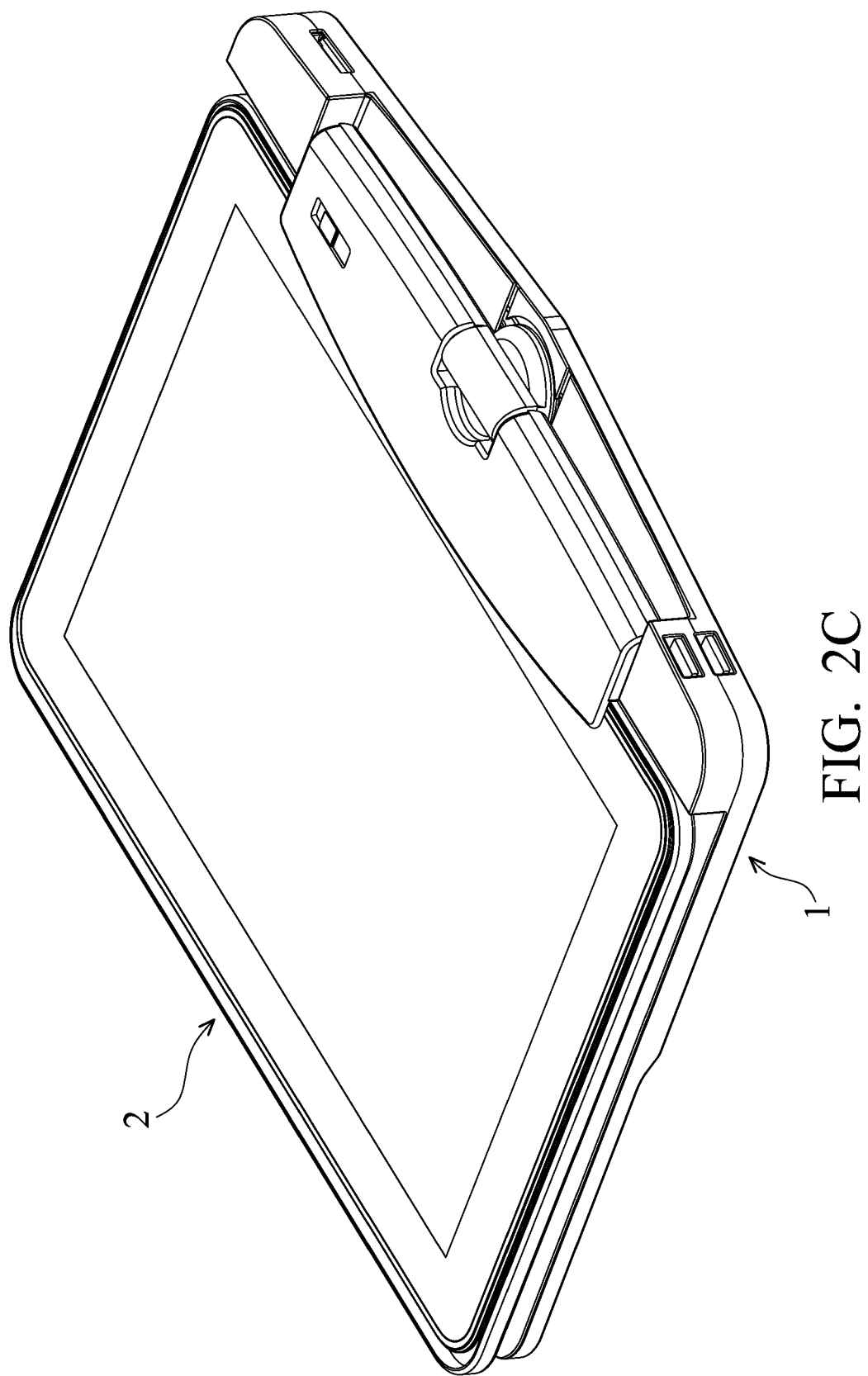
Figure 2D:
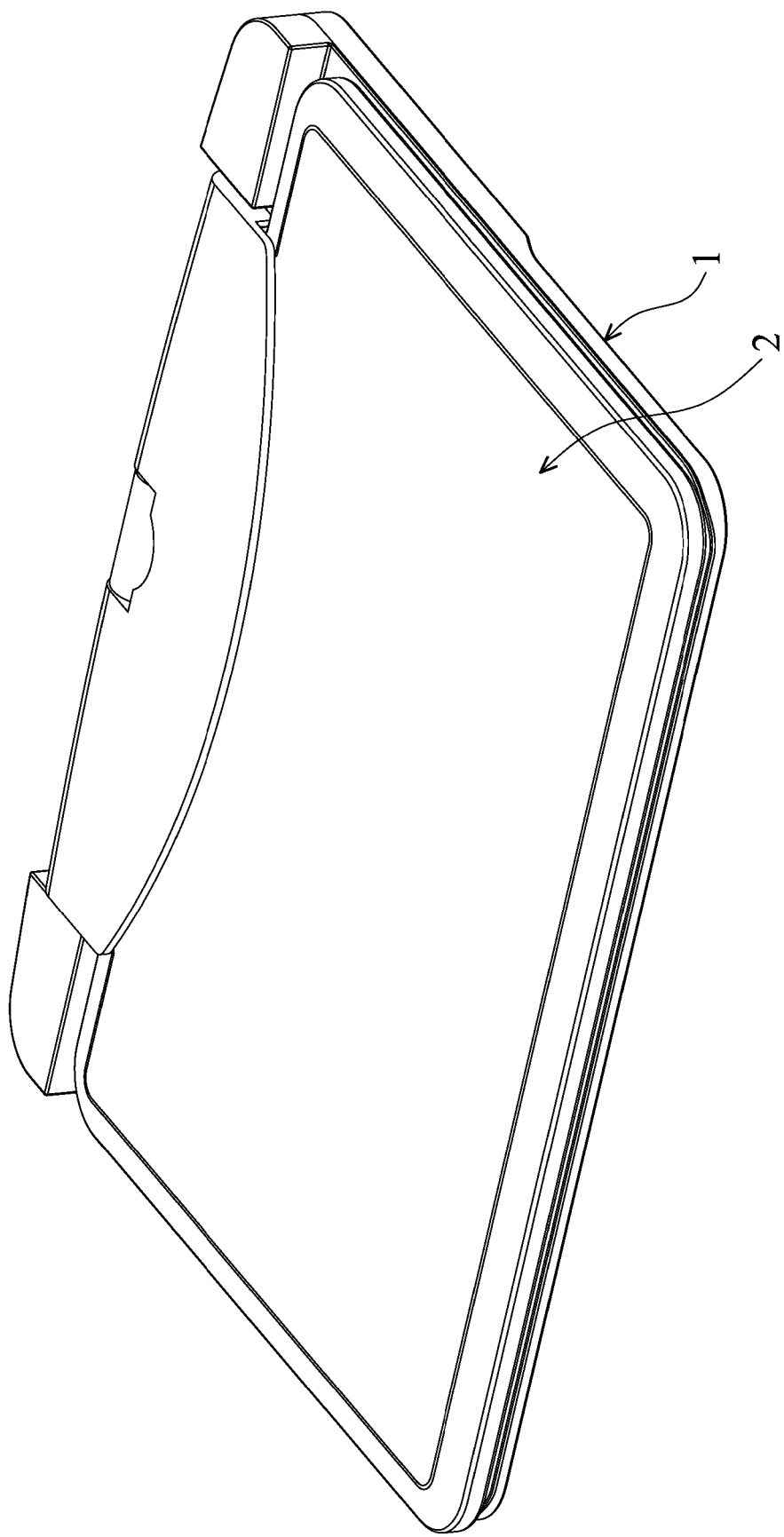

With reference to FIGS. 2A to 2D, the pivot unit 20 comprises a first pivot axis A1 and a second pivot axis A2, and first pivot axis A1 is perpendicular to the second pivot axis A2. The touch display device 2 (for example, tablet computer) can be pivoted on the docking device 1 around the first pivot axis A1 and the second pivot axis A2 to satisfy the operation demands of users. For example, when the user inputs information into the touch display device 2 via the operation interface 40, the touch display device 2 can be pivoted to the orientation as shown in FIG. 2A. The user also can operate the touch display device 2 via the touch display thereof directly when the touch display device 2 is disposed on the docking device 1, as shown in FIG. 2C. Additionally, when the user carries the docking device 1 and the touch display device 2 simultaneously, the touch display device 2 can be rotated into the orientation as shown in FIG. 2D, wherein the touch display of the touch display device 2 faces the docking device 1.

Figure 3:
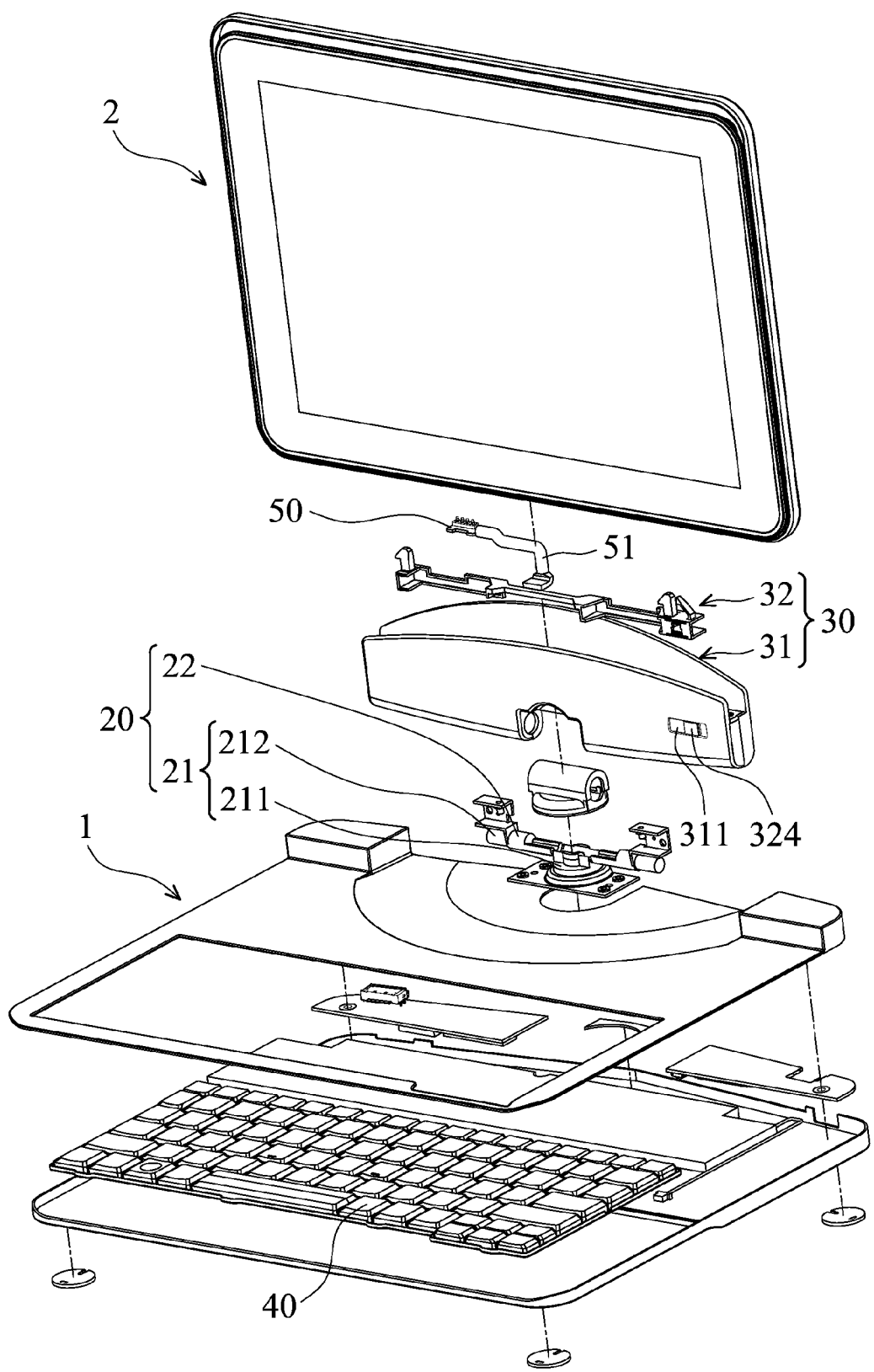
FIG. 3 is an exploded view of the docking device of the embodiment of the invention.

With reference to FIG. 3, the pivot unit 20 comprises a first pivot element 21 and second pivot elements 22. The first pivot element 21 is connected to the docking body 10. The second pivot elements 22 are connected the frame 30. The second pivot elements 22 pivot on the first pivot element 21. The first pivot element 21 pivots around the first pivot axis A1, and second pivot elements 22 pivot around the second pivot axis A2. The first pivot element 21 comprises a first section 211 and a second section 212, the first section 211 is connected to the docking body 10, the first section 211 is connected to the second section 212, and the second pivot element 22 is disposed on the second section 212.

Figure 4:
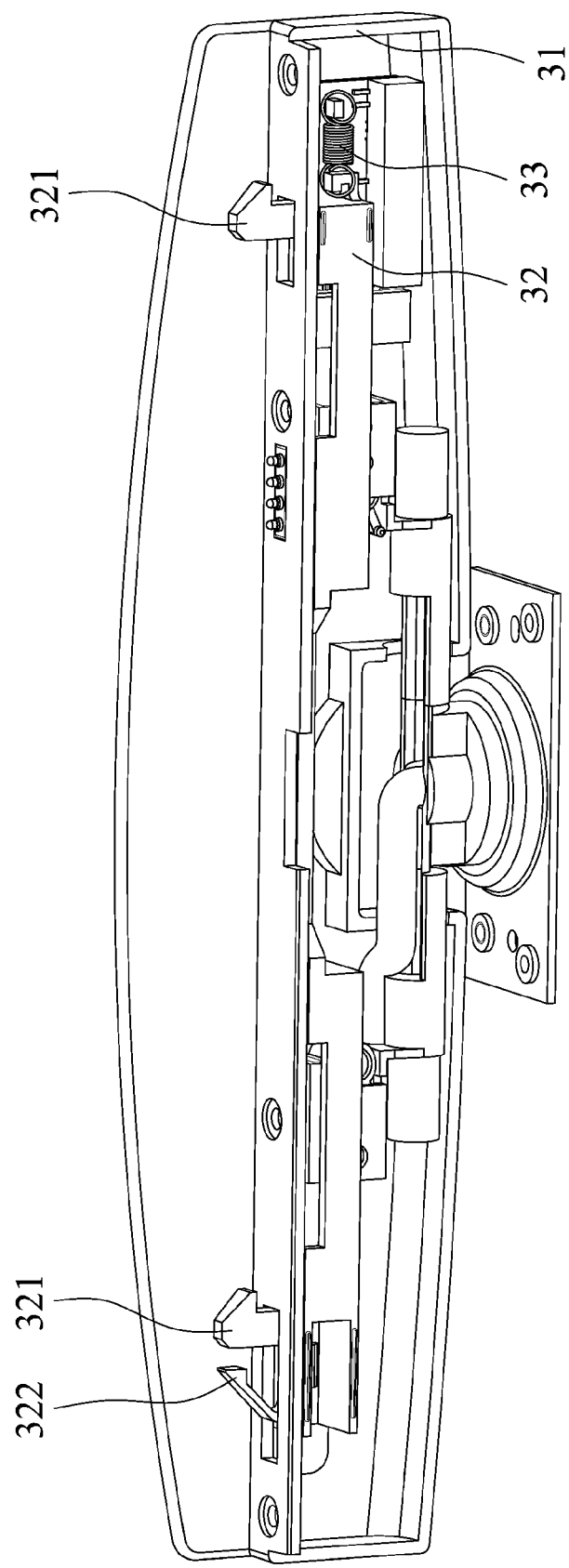
FIG. 4 shows detailed structure of the docking device of the embodiment of the invention.

With reference to FIGS. 3 and 4, the frame 30 comprises a frame body 31, a wedging element 32 and an elastic element 33, and the elastic element 33 is connected to the frame body 31 and the wedging element 32. The wedging element 32 comprises a hook 321.

Figure 5A:
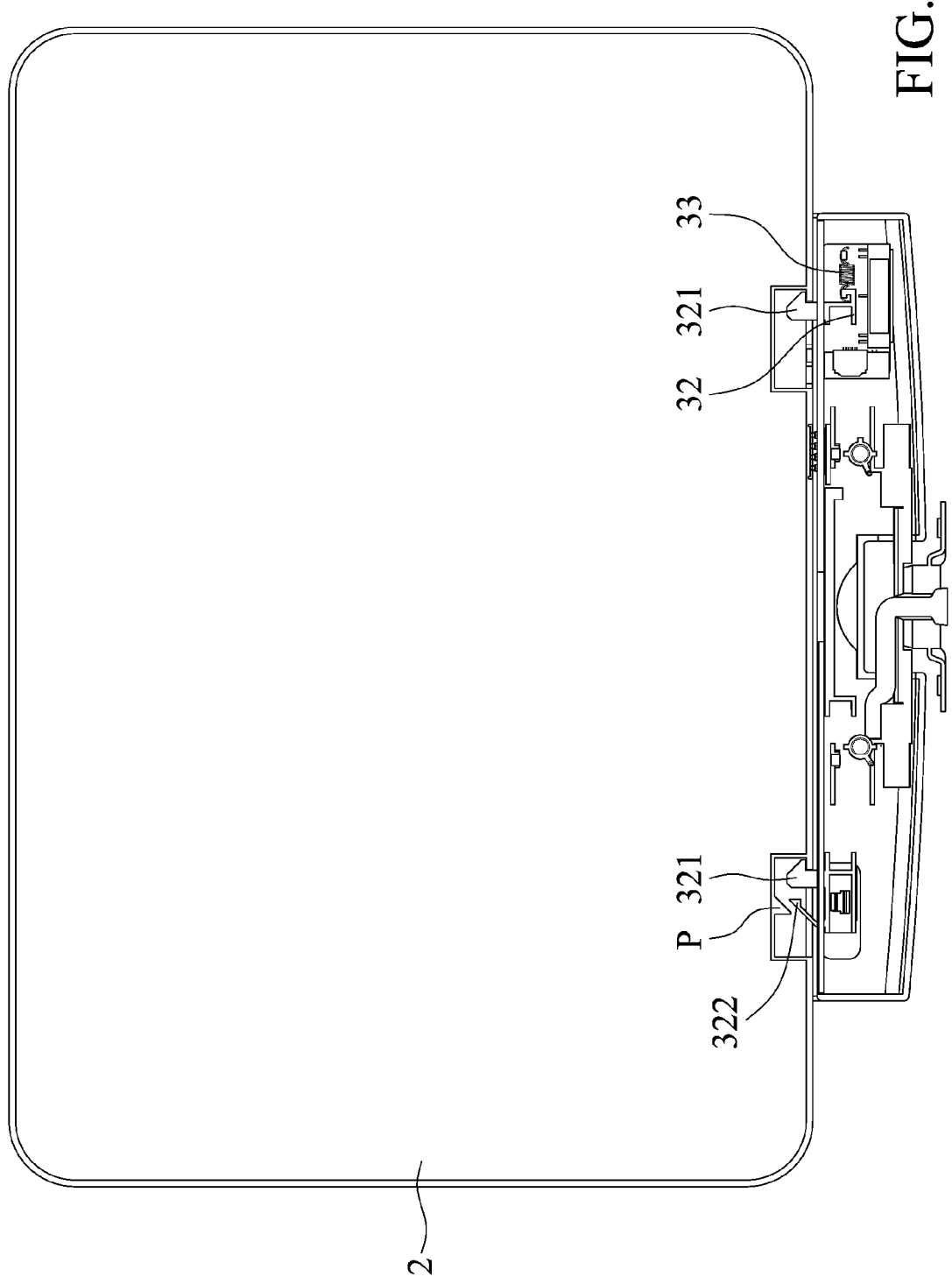
FIG. 5A shows the wedging element of the docking device of the embodiment of the invention in the wedging position.
Figure 5B:
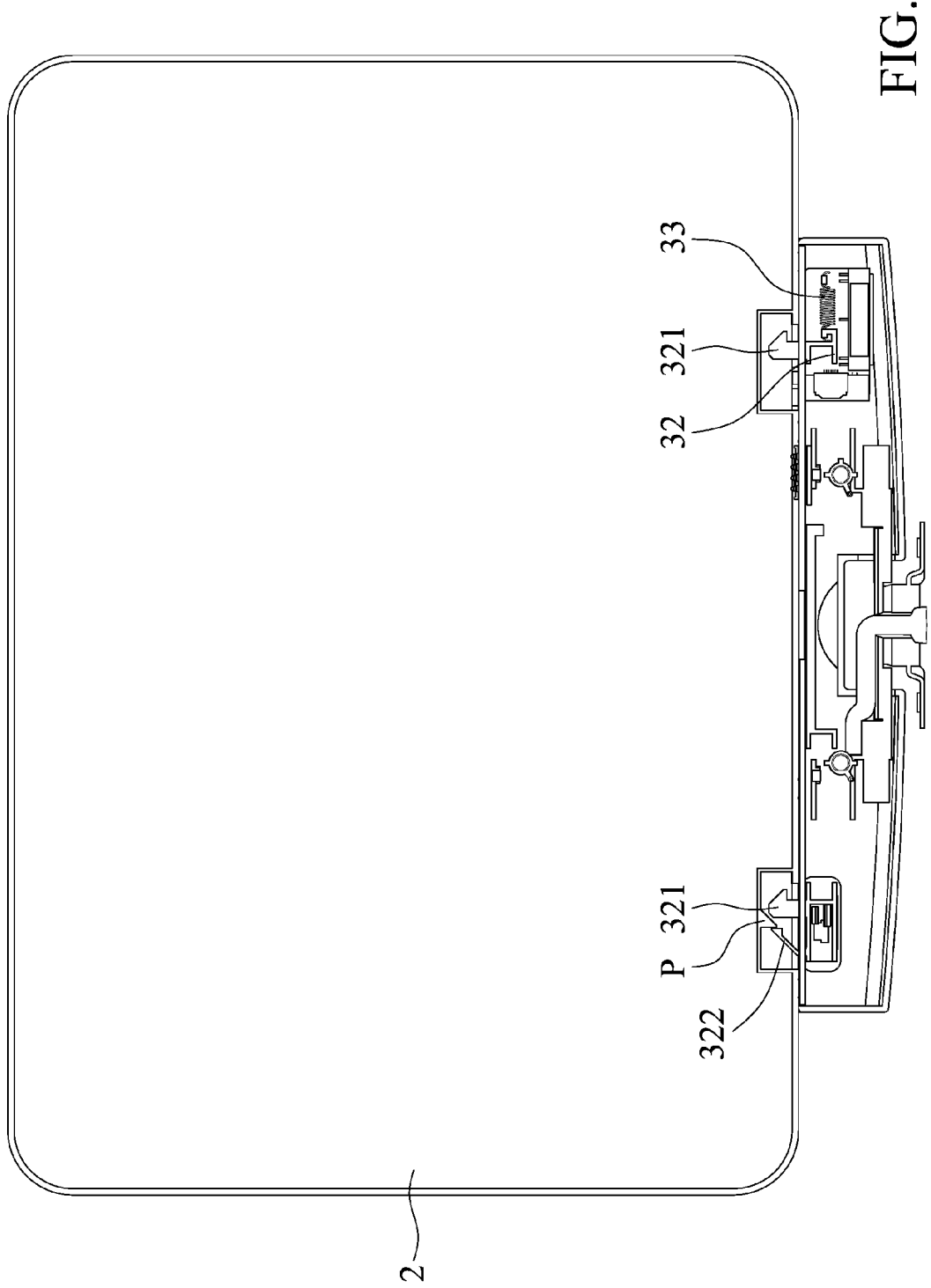
FIG. 5B shows the wedging element of the docking device of the embodiment of the invention in the release position.

With reference to FIGS. 5A and 5B, the wedging element 32 is moved between a wedging position (FIG. 5A) and a release position (FIG. 5B) relative to the frame body 31. When the wedging element 32 is in the wedging position (FIG. 5A), the hook 321 of the wedging element 32 wedges the touch display device 2. When the wedging element 32 is in the release position (FIG. 5B), the hook 321 of the wedging element 32 releases the touch display device 2. After the touch display device 2 is detached from the frame 30, the elastic element 33 applies an elastic force upon the wedging element 32 to move the wedging element 32 back to the wedging position (FIG. 5A). The elastic element 33 can be an extension spring or other springs. In this embodiment, the wedging element 32 further includes an elastic arm 322. With reference to FIG. 5B, when the wedging element 32 is being moved to the release position, the elastic arm 322 abuts a protrusion P inside the touch display device 2 to prevent the wedging element 32 from moved back to the wedging position by the elastic element 33. Therefore, the user can detach the touch display device 2 form the docking device 1 with his/her single hand.

With reference to FIG. 3, in the embodiment of the invention, an opening 311 is formed on the frame body 31, the wedging element 32 comprises a button 324, and the button 324 is located in the opening 311. The wedging element 32 can be moved from the wedging position to the release position by pushing the button 324.

With reference to FIG. 3, the docking device 1 further comprises a touch display device connector 50 and a cable 51. The touch display device connector 50 and the cable 51 are disposed on the frame 30 to connect the touch display device 2 to an inner circuit of the docking device 1. The cable 51 passes through a central portion of the first section 211.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A docking device for connection to a touch display device, comprising:
   a docking body;
   a pivot unit, connected to the docking body; and
   a frame, connected to the pivot unit and pivoted relative to the docking body, wherein the touch display device is detachably disposed on the frame,
   wherein the frame comprises a frame body and a wedging element, and the wedging element is movable between a wedging position and a release position relative to the frame body, and when the wedging element is in the wedging position, the wedging element wedges the touch display device, and when the wedging element is in the release position, the wedging element releases the touch display device,
   wherein the frame further comprises an elastic element, and the elastic element is connected to the frame body and the wedging element, and when the touch display device is detached from the frame, the elastic element applies an elastic force upon the wedging element to move the wedging element back to the wedging position,
   wherein the wedging element further comprises an elastic arm, and when the wedging element is being moved to the release position, the elastic arm abuts the touch display device to prevent the wedging element from moving back to the wedging position.

2. The docking device as claimed in claim 1, wherein the pivot unit comprises a first pivot axis and a second pivot axis, and first pivot axis is perpendicular to the second pivot axis.

3. The docking device as claimed in claim 2, wherein the pivot unit comprises a first pivot element and at least one second pivot element, the first pivot element is connected to the docking body, the second pivot element is connected to the frame, the second pivot element pivots on the first pivot element, the first pivot element pivots around the first pivot axis, and second pivot element pivots around the second pivot axis.

4. The docking device as claimed in claim 3, wherein the first pivot element comprises a first section and a second section, the first section is connected to the docking body, the first section is connected to the second section, and the second pivot element is disposed on the second section.

5. The docking device as claimed in claim 1, wherein the wedging element comprises a hook, and the hook wedges the touch display device.

6. The docking device as claimed in claim 1, wherein an opening is formed on the frame body, and the wedging element comprises a button, and the button is located in the opening.

7. The docking device as claimed in claim 1, further comprising an operation interface disposed on the docking body.

8. The docking device as claimed in claim 1, further comprising a touch display device connector, disposed on the frame to be connected to the touch display device.

9. A portable electronic device, comprising:
   a touch display device; and
   a docking device, comprising:
      a docking body;
      a pivot unit, connected to the docking body; and
      a frame, connected to the pivot unit and pivoted relative to the docking body, wherein the touch display device is detachably disposed on the frame,
   wherein the frame comprises a frame body and a wedging element, and the wedging element is movable between a wedging position and a release position relative to the frame body, and when the wedging element is in the wedging position, the wedging element wedges the touch display device, and when the wedging element is in the release position, the wedging element releases the touch display device,
   wherein the wedging element further comprises an elastic arm, and when the wedging element is being moved to the release position, the elastic arm abuts the touch display device to prevent the wedging element from moving back to the wedging position.

10. The portable electronic device as claimed in claim 9, wherein the pivot unit comprises a first pivot axis and a second pivot axis, and first pivot axis is perpendicular to the second pivot axis.

11. The portable electronic device as claimed in claim 10, wherein the pivot unit comprises a first pivot element and at least one second pivot element, the first pivot element is connected to the docking body, the second pivot element is connected to the frame, the second pivot element pivots on the first pivot element, the first pivot element pivots around the first pivot axis, and second pivot element pivots around the second pivot axis.

12. The portable electronic device as claimed in claim 11, wherein the first pivot element comprises a first section and a second section, the first section is connected to the docking body, the first section is connected to the second section, and the second pivot element is disposed on the second section.

13. The portable electronic device as claimed in claim 9, wherein the wedging element comprises a hook, and the hook wedges the touch display device.

14. The portable electronic device as claimed in claim 9, wherein the frame further comprises an elastic element, and the elastic element is connected to the frame body and the wedging element, and when the touch display device is detached from the frame, the elastic element applies an elastic force upon the wedging element to move the wedging element back to the wedging position.

15. The portable electronic device as claimed in claim 9, wherein an opening is formed on the frame body, and the wedging element comprises a button, and the button is located in the opening.

16. The portable electronic device as claimed in claim 9, wherein the docking device further comprises an operation interface disposed on the docking body.

17. The portable electronic device as claimed in claim 9, wherein the docking device further comprises a touch display device connector, disposed on the frame to be connected to the touch display device.

\* \* \* \* \*